United States Patent
Damodaran

(10) Patent No.: US 8,990,410 B1
(45) Date of Patent: Mar. 24, 2015

(54) DEVICES, SYSTEMS, AND/OR METHODS FOR PROCESSING TRANSACTIONS

(75) Inventor: Suresh Damodaran, Reston, MA (US)

(73) Assignee: IBM International Group BV, Amsterdam (NL)

( * ) Notice: Subject to any disclaimer, the term of this patent is extended or adjusted under 35 U.S.C. 154(b) by 240 days.

(21) Appl. No.: 12/332,418

(22) Filed: Dec. 11, 2008
(Under 37 CFR 1.47)

(51) Int. Cl.
| | | |
|---|---|---|
| *G06F 15/16* | (2006.01) | |
| *G06F 15/173* | (2006.01) | |
| *G06F 7/00* | (2006.01) | |
| *G06F 17/00* | (2006.01) | |
| *H04L 12/24* | (2006.01) | |
| *G06F 17/30* | (2006.01) | |

(52) U.S. Cl.
CPC ...... *H04L 41/5009* (2013.01); *G06F 17/30578* (2013.01)
USPC ........... 709/228; 709/203; 709/223; 709/224; 707/602; 707/611; 707/613

(58) Field of Classification Search
USPC ......... 709/215, 219, 227, 201–203, 217, 223, 709/224, 228; 707/602, 609, 611, 613
See application file for complete search history.

(56) References Cited

U.S. PATENT DOCUMENTS

| | | | |
|---|---|---|---|
| 5,734,898 A | 3/1998 | He | |
| 6,336,135 B1 * | 1/2002 | Niblett et al. | 709/215 |
| 6,886,041 B2 | 4/2005 | Messinger et al. | |
| 7,143,347 B2 | 11/2006 | Su | |
| 7,496,036 B2 * | 2/2009 | Olshefski | 370/235 |
| 7,756,982 B2 * | 7/2010 | Johnson | 709/227 |
| 7,779,133 B2 * | 8/2010 | Subramaniam | 709/227 |
| 8,380,657 B2 * | 2/2013 | Shaik et al. | 707/602 |
| 2002/0174421 A1 * | 11/2002 | Zhao et al. | 717/174 |
| 2004/0167879 A1 | 8/2004 | Cotner | |
| 2004/0193640 A1 * | 9/2004 | Armstrong et al. | 707/103 R |
| 2005/0125508 A1 | 6/2005 | Smith | |
| 2006/0015622 A1 | 1/2006 | Gungabeesoon | |
| 2006/0064470 A1 * | 3/2006 | Sargent et al. | 709/219 |
| 2006/0168101 A1 | 7/2006 | Mikhailov | |
| 2006/0168240 A1 * | 7/2006 | Olshefski | 709/227 |
| 2006/0259911 A1 | 11/2006 | Weinrich | |
| 2007/0002825 A1 | 1/2007 | O'Brien | |
| 2008/0189350 A1 * | 8/2008 | Vasa et al. | 709/201 |
| 2009/0106390 A1 * | 4/2009 | Kirwan et al. | 709/217 |
| 2009/0135731 A1 * | 5/2009 | Secades et al. | 370/252 |
| 2010/0082532 A1 * | 4/2010 | Shaik et al. | 707/609 |

FOREIGN PATENT DOCUMENTS

| | | |
|---|---|---|
| EP | 1657869 | 5/2006 |
| EP | 1715422 | 10/2006 |

* cited by examiner

*Primary Examiner* — Tae Kim
(74) *Attorney, Agent, or Firm* — Steven M. Greenberg, Esq.; CRGO Law

(57) ABSTRACT

Certain exemplary embodiments can provide a method, which can comprise, responsive to a determination that a Web-based transaction has caused an exceedance of a maximum threshold percentage of transactions processed offline, at a user interface of an information device, rendering an automatic alert indicative of the exceedance. The Web-based transaction can be requested from a browser.

13 Claims, 4 Drawing Sheets

DEVICES, SYSTEMS, AND/OR METHODS FOR PROCESSING TRANSACTIONS

CROSS-REFERENCES TO RELATED APPLICATIONS

This application is related to, and incorporates by reference herein in its entirety U.S. Non-Provisional patent application Ser. No. 11/703,010, filed 6 Feb. 2007.

BACKGROUND

United States Patent No. 20060015622 (Hickman), which is incorporated by reference herein in its entirety, allegedly discloses a "method, apparatus, and computer instructions in a data processing system for enabling asynchronous transaction interactions. A Web page containing transaction data is sent to a client, wherein the Web page includes a process to periodically submit a timeout notification. Program logic is executed after sending the Web page to the client. In response to an event during execution of the program logic, it is determined whether user data input into the Web page at the client is available at the data processing system. In response to user data being present, the user data is processed, wherein asynchronous processing of transactions occur between the data processing system and the client." See Abstract.

United States Patent No. 20060168101 (Mikhailov), which is incorporated by reference herein in its entirety, allegedly discloses a "proactive browser system configured to implement stateful frame navigation using content specific icons, background frame maintenance, and asynchronous frame submissions. The proactive browser system includes three components: user-side proactive application terminals (PAT), network-resident proactivity enablement servers (PES), and server-side proactive wireless web-based application servers. The PAT resides on user terminals and functions as an enhanced browser that accommodates proactive application services. The PES resides in the wireless network between the proactive application servers and the user terminals, and implements proactivity support services including queuing of proactive application submissions, presence detection of proactive application terminals, and routing of proactive application submissions from proactive application servers to the proactive application terminals. The proactive application servers are web-based application servers configured to provide proactive application services to take advantage of the enhanced capabilities enabled by the PAT and PES components." See Abstract.

United States Patent No. 20070002825 (O'Brien), which is incorporated by reference herein in its entirety, allegedly discloses a "system for blending synchronous and asynchronous computer communication applications that determines when a user of a synchronous communication application, such as an instant messaging application, attempts to send a message to another user that is unavailable for synchronous communications, and that forwards the message from the synchronous communication application to an asynchronous communication application for delivery. The forwarded message may be an email message, and the system may operate to determine a destination electronic mail address of the destination user for inclusion in the forwarded message, and include an indication in the forwarded message that it has been forwarded from the synchronous communication application. This indication enables the asynchronous communication application to perform special processing when the receiving user retrieves the forwarded message from the asynchronous communication application. The special processing may include automatically determining whether the sending user is currently available for synchronous communications, and, if so, providing a synchronous communication session between the receiving user and the sending user. If the sending user is not currently available for synchronous communications, the receiving user is provided with the option of responding to the forwarded message using the asynchronous communication application." See Abstract.

SUMMARY

Certain exemplary embodiments can provide a method, which can comprise, responsive to a determination that a Web-based transaction has caused an exceedance of a maximum threshold percentage of transactions processed offline, at a user interface of an information device, rendering an automatic alert indicative of the exceedance. The Web-based transaction can be requested from a browser.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
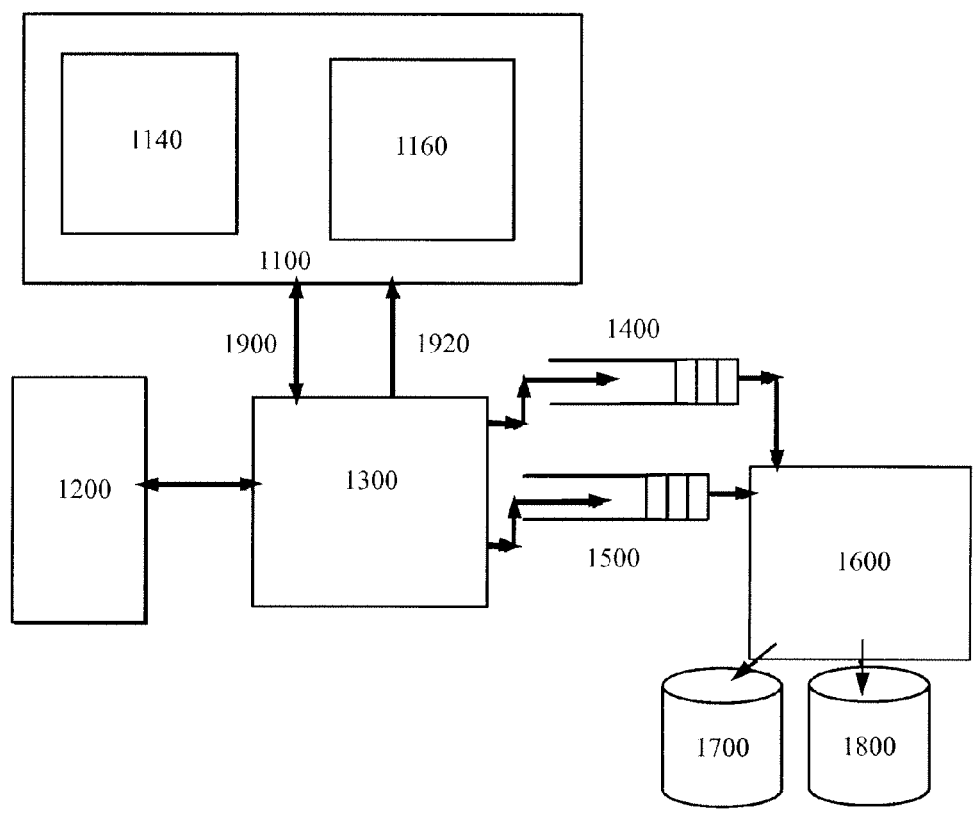
FIG. 1 is a block diagram of an exemplary embodiment of a system 1000.

Certain exemplary embodiments can provide a method, which can comprise, responsive to a determination that a Web-based transaction has caused an exceedance of a maximum threshold percentage of transactions processed offline, at a user interface of an information device, rendering an automatic alert indicative of the exceedance. The Web-based transaction can be requested from a browser.

On-line transaction systems can communicate with a user via a browser front-end. As used herein, the phrase via means by way of and/or utilizing. As used herein, the phrase Web-based means being derived from the Internet and/or a device communicatively coupled to the Internet. As used herein, the phrase user means a person, organization, process, device, program, protocol, and/or system that uses a device, system, process, and/or service. As used herein, the phrase transaction means a legal, intangible, tangible, and/or physical exchange or transfer of goods and/or rights. As used herein, the phrase physical means tangible, real, and/or actual. As used herein, the phrase physically means existing, happening, occurring, acting, and/or operating in a manner that is tangible, real, and/or actual. As used herein, the phrase can means is capable of, in at least some embodiments. As used herein, the phrase browser means a user-operable program adapted to access and render information via the Internet and/or another network. As used herein, the phrase render means to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc. As used herein, perceptible means capable of being perceived by the human senses. As used herein, the phrase information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information. As used herein, the phrase transform means to change in measurable: form, appearance, nature, and/or character.

Such on-line transaction systems can experience time-out failures for a variety of reasons. Failures that result from performance problems can be transformed into 'delayed processing' or 'offline' processing calls. As used herein, the phrase from means used to indicate a source. Other transactions can be scheduled to process offline based on the time of the day, or other preferences. As used herein, the phrase time means a measurement of a point in a nonspatial continuum in which events occur in apparently irreversible succession from the past through the present to the future. Such processing can offer an estimated time for response and/or an option to cancel an offline call, which can be helpful to users who might otherwise have to resort to resubmission of a transaction and hope for the best. As used herein, the phrase option means a choice. As used herein, the phrase cancel means to terminate an act and/or method with or without completion. As used herein, the phrase complete means to substantially finish a task and/or procedure. As used herein, the phrase substantially means to a considerable, large, and/or great, but not necessarily whole and/or entire, extent and/or degree. As used herein, the phrase estimate means (n.) a calculated value approximating an actual value. (v.) to calculate and/or determine approximately and/or tentatively. As used herein, the phrase value means a measured, assigned, determined, and/or calculated quantity or quality for a variable and/or parameter.

Applications that support large number of transactions can perform within established limits of response time under load conditions. As used herein, the phrase support means to bear the weight of, especially from below. As used herein, the phrase establish means to create, form, and/or set-up. As used herein, the phrase set means a related plurality of predetermined elements; and/or one or more distinct items and/or entities having a specific common property or properties. As used herein, the phrase setting up means configuring for use. When the load conditions become excessive or certain internal errors occur, catastrophic failures can occur that can prevent further transactions from taking place. For example, systems comprising a web based front end, can display an internal failure message on the browser. As used herein, the phrase system means a collection of mechanisms, devices, machines, articles of manufacture, processes, data, and/or instructions, the collection designed to perform one or more specific functions. As used herein, the phrase comprise means to include but not be limited to, what follows. Normally, users of such systems can be left with such cryptic messages with no details on what to expect. Users can submit the requests again and again, resulting in building up the queues for processing, thus exacerbating problems even further. As used herein, the phrase request means (v.) to express a need and/or desire for; to inquire and/or ask for. (n.) that which communicates an expression of desire and/or that which is asked for. As used herein, the phrase queue means to place in a sequence of stored data or programs awaiting processing.

Certain exemplary embodiments can allow users to gain better estimates of response times by processing some real-time requests in an offline queue through the use of past records of time-out and/or response patterns of transactions. As used herein, the phrase record means a collection of structured data elements organized by fields. A group of records forms a file, table, and/or database. For example, a record might comprise data elements stored in fields such as: a name field, an address field, and a phone number field As used herein, the phrase real-time means substantially contemporaneous to a current time. For example, a real-time transmission of information can be initiated and/or completed within about 120, 60, 30, 15, 10, 5, and/or 2, etc. seconds of receiving a request for the information. As used herein, the phrase transmit means to provide, furnish, supply, send as a signal, and/or to convey (e.g., force, energy, and/or information) from one place and/or thing to another. As used herein, the phrase receive means to gather, take, acquire, obtain, accept, get, and/or have bestowed upon.

As used herein, the phrase hard real time means relating to computer systems that provide an absolute deterministic response to an event. Such a response is not based on average event time. Instead, in such computer systems, the deadlines are fixed and the system must guarantee a response within a fixed and well-defined time. As used herein, the phrase system means a collection of mechanisms, devices, data, and/or instructions, the collection designed to perform one or more specific functions. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers. As used herein, the phrase signal means information encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc. As used herein, digital means non-analog and/or discrete.

If the processing time is determined to be greater than the maximum response time, or the size of the data set is greater than the data threshold, the data set can be redirected to another process which will transfer the data set to the client via an Extract, Transform, and Load (ETL) server. As used herein, the phrase threshold means a point that when exceeded produces a given effect or result. Certain exemplary embodiments can utilize an Offline Response Generation (OLRG) Algorithm, which can comprise:

establishing an initial time-out value of T-out-real for real-time transactions, and/or T-out-off for offline transactions;

putting any transaction that is generated by the user through a browser action into either of Real Time Processing Queue, or Offline Processing Queue; the decision to place in either of these queues can be made by an Offline Decision algorithm (described separately, and referred to as OLD algorithm);

for each transaction that is placed in the Offline Processing Queue, establishing a user visible (and/or user controllable) call back with the front-end so that when the offline processing is over, the response is given to the user; the user also has the ability to control (kill) the call-back for the specific transaction, if the information is not needed; and/or when the call-back is registered with the front-end, providing the estimated response time, which can be rendered to the user; the estimated response time can be generated by the OLD algorithm.

Any transaction in the real-time queue that does not return a response within T-out-real can be cancelled. The transaction's response record can be logged with T-out-real value using the OLD algorithm. A call-back can be registered with the front-end, with T-out-off as the estimated response time. The transaction can be regenerated and/or placed in the Offline Processing Queue by the system. The user at the front-end can cancel the call-back whenever desired. If the user cancels the call-back, the transaction can be taken out of the offline-processing queue.

In certain exemplary embodiments, the OLD algorithm can comprise two components; a data collection algorithm, and a decision generator algorithm. As used herein, the phrase generate means to create, produce, render, give rise to, and/or bring into existence. As used herein, the phrase data means distinct pieces of information, usually formatted in a special or predetermined way and/or organized to express concepts, and/or represented in a form suitable for processing by an information device. As used herein, the phrase device means a machine, manufacture, and/or collection thereof. The data collection algorithm can be implemented with an agent that monitors incoming data on transactions, and/or their time out values. In certain exemplary embodiments, two types of data can be collected.

The transaction can be pulled from the real-time queue and/or placed in the offline queue because of a time out that happened while in real-time queue. The time out duration can be noted. This transaction can be placed in the "Offline Transactions List." Removal of a transaction from the offline transactions list can be performed by an administrator, either selectively or completely. The expected time of response can be denoted as T-out-off.

When an offline transaction returns, the time of response can be noted for that transaction. This information can be used to set T-out-off by the administrator.

In certain exemplary embodiments, the decision generator algorithm can be implemented via one or more of the functions described below.

When a transaction request is received from the user, the transaction can be checked to see whether the transaction is in the Offline Transaction List. If so, the transaction can be flagged as an offline. Based on the offline priority criteria, the transaction can be placed in an appropriate place in the Offline Processing Queue. The rules within offline priority criteria can describe a priority order of attributes for placement in the offline queue. For example, one attribute can be the place of origin that can be used to prioritize off-lining of any requests from a certain user or company over other offline requests. An expected response time can be provided to the user based on the previous completed records of this transaction registered. If there are no such records, then T-out-off can be the expected response time.

The offline criteria can use an "Acceptable Offline Percentage" that can be set by the administrator of the algorithm. This percentage can be used as a release valve to alert the administrator to act when more than a certain percentage of transactions are being offline. The actions can comprise increasing of T-out-real and/or looking for any data base or application failures in the system.

In certain exemplary embodiments, the OLRG algorithm described above can assume the value of T-out-real can be substantially similar for all transactions, and/or T-out-off can be substantially similar for all offline transactions. It is possible to assign different initial values of T-out-real and/or T-out-off for specific transactions based on a better knowledge of the application, and/or performance of the application for certain types of transactions. As used herein, the phrase type means a number of things having in common traits or characteristics that distinguish them as a group or class. The OLRG and/or OLD algorithms can be moderately changed to accommodate this additional information. The initial assignment of T-out-real for each individual transaction using the knowledge of applications can be possible, since some transactions that involve reading data base content can be faster than those that involve updating of multiple tables of a database. As used herein, the phrase read means to obtain from a memory device. The values of the Time-out-real can be increased or decreased based on rules for time-out update (within the modified OLD algorithm). For each installation, these values can be different for the same transactions, and/or can provide a good basis for performance analysis. As used herein, the phrase install means to connect and/or place in position and prepare for use. As used herein, the phrase provide means to furnish, supply, give, convey, send, and/or make available.

FIG. 1 is a block diagram of an exemplary embodiment of a system 1000. A front-end 1200 can be where the transaction originates by physical action by the user. The call-back mechanism can be implemented in front-end 1200 so the offline processing of transactions can be controlled (killed/cancelled) by the user. Transactions can be routed to a Transaction Switch Box 1300 that can place the transactions in an Offline Processing Queue 1400 or a Real Time Processing Queue 1500 by implementing the OLRG algorithm.

One or more applications 1600 in the backend can process offline queue transactions with a lower priority than the real-time queue transactions. Applications 1600 can be communicatively coupled to a first database 1700 and/or a second database 1800. Certain exemplary embodiments can provide better response times for the real-time transactions. A Transmission Time-out Data Collection 1140, an Offline Transaction List, and/or an Offline priority criteria 1160 can be managed and/or utilized by an Offline Decision processor 1100. Offline Decision (OLD) processor 1100 can be responsible for implementing the OLD algorithm. OLD processor 1100 can exchange transmission information 1900 with, and/or receive time-out and response data 1920 from, Transaction Switch Box 1300.

As used herein, the phrase processor means a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller. As used herein, the phrase special purpose computer means a computer comprising a processor having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit. As used herein, the phrase special purpose processor means a processor, having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit.

OLD processor 1100 can be provided with the time-out data for transactions that were placed in real-time queue 1500, as well as response times of transactions in offline queue 1400. The latter information can be useful in providing better estimates to users in the call-back.

Using application specific rules for time-out values and/or offline priority criteria 1160, considerable tweaking of response times can be provided to specific users or classes of users. Certain exemplary embodiments can spread the load on the system across different time periods by putting more transactions in offline processing queue 1400.

Transaction Switch Box 1300 can provide an administrative console that can provide information on the "Acceptable Offline Transaction Percentage" as well as to enable actions that can be conducted by the administrator. As used herein, the phrase percentage means a fraction of a whole expressed as a count of parts per one hundred parts.

Certain exemplary embodiments can provide an estimated time for response for some types of queries, instead of requesting a resubmission of the queries another time. Certain exemplary embodiments can support spreading of processing loads across different time periods, thus facilitating load balancing. Certain exemplary embodiments can allow identifying specific requests that can be preprocessed to reduce the load on the system. As used herein, the phrase identify means to specify, recognize, detect, and/or establish the identity, origin, nature, and/or definitive characteristics of. Certain exemplary embodiments can selectively provide faster service based on a variety of criteria, including preferential service of only some customers. Certain exemplary embodiments can provide relatively good response times to some types of users where users are accessing the same shared on-line system. Certain exemplary embodiments can be applied to existing on-line software systems in production to provide benefits.

Figure 2:
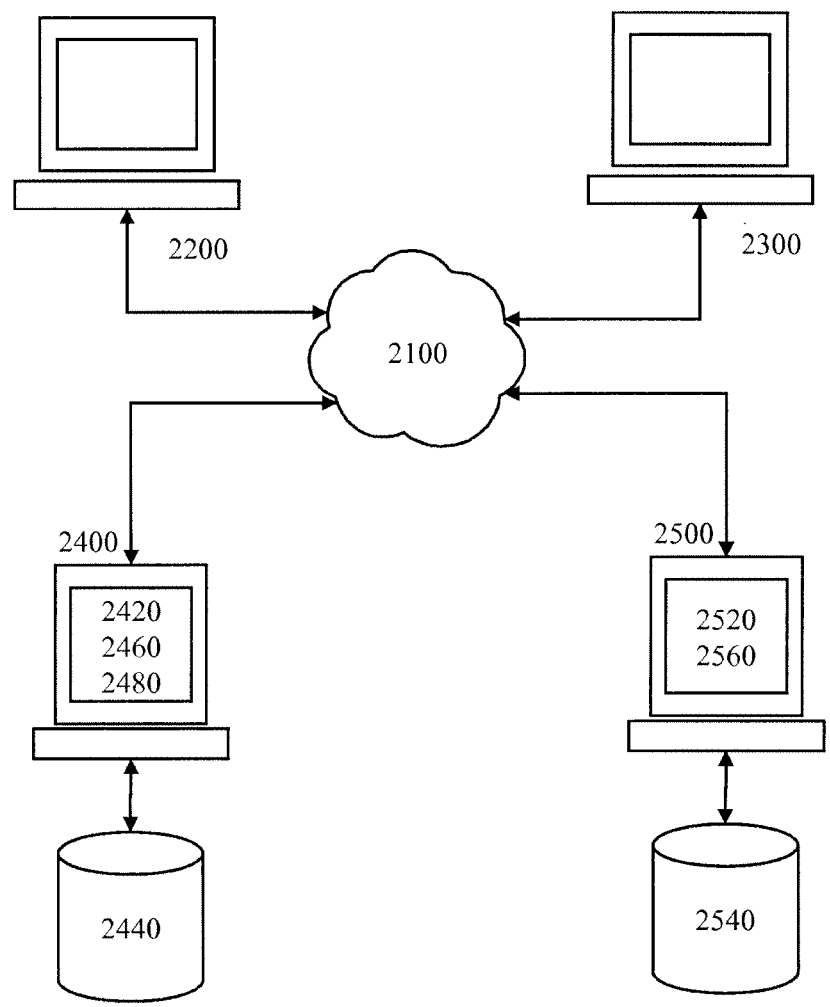
FIG. 2 is a block diagram of an exemplary embodiment of a system 2000.

FIG. 2 is a block diagram of an exemplary embodiment of a system 2000, which can comprise a network 2100, a first server 2400, and a second server 2500. First server 2400 and/or second server 2500 can be adapted to provide services, such as Web-based services, to a plurality of clients and/or client devices, such as a first information device 2200 and/or a second information device 2300. As used herein, the phrase plurality means more than one. As used herein, the phrase adapted to means suitable, fit, and/or capable of performing a specified function. As used herein, the phrase network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof. First server 2400 can comprise a user program 2420 and a user interface 2460. First server 2400 can be an application server, such as a Web Applications Server, adapted to provide application access to a user program 2420, which can be an Enterprise Application. As used herein, the phrase Transmission Control Protocol (TCP) means a protocol that can establish a virtual connection between a destination and a source.

As used herein, the phrase user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc. As used herein, the phrase human-machine interface means hardware and/or software adapted to render information to a user and/or receive information from the user; and/or a user interface.

In certain exemplary embodiments, an application server can be a component-based product that resides in the middle-tier of a server centric architecture. The application server can provide middleware services for security and/or state maintenance, along with data access and/or persistence. Java application servers can be based on the Java™ 2 Platform, Enterprise Edition (J2EE™). J2EE can use a multi-tier distributed model, which generally can include a Client Tier, a Middle Tier, and/or an EIS Tier. The Client Tier can be one or more applications or browsers. The J2EE Platform can be in a Middle Tier and/or comprise a Web Server and/or an EJB Server, which can also be called "containers". There can be additional sub-tiers in the middle tier. The Enterprise Information System (EIS) tier can utilize and/or serve the existing applications, files, and/or databases. For the storage of business data, the J2EE platform can utilize a database that is accessible through the Java Database Connectivity (JDBC), Structured Query Language embedded in Java (SQLJ), and/or Java Data Objects (JDO) Application Program Interface (API). The database can be accessible from web components, enterprise beans, and/or application client components.

User interface 2460 can be adapted to render information regarding one or more client requests for a transaction and/or information. First server 2400 can comprise a memory device 2440, which can be adapted to store one or more databases. First server 2400 can be adapted to receive a request for the transaction and/or information from a client, such as first information device 2200.

First server 2400 can be adapted to respond to the request synchronously if a data set associated with the request is smaller than the data set threshold value and/or the data set can be acquired and/or transmitted and/or the transaction can be completed in a time interval that is less than the transaction timeout threshold value. As used herein, the phrase timeout means a condition in which an elapsed time exceeds a predetermined time threshold. As used herein, the phrase associate means to relate, bring together in a relationship, map, combine, join, and/or connect. As used herein, the phrase connect means physically or logically join, link, couple, and/or fasten two or more entities. As used herein, the phrase couple means to join, connect, and/or link together. In event that the data set associated with the request is greater than the data set threshold value, the data set is not acquired and/or transmitted in a time interval that is less than the transaction timeout threshold value, and/or the transaction is not completed within a predetermined time period, the request can be responded to asynchronously and/or offline by second server 2500, which can be an Extract-Transform-Load (ETL) server. As used herein, the phrase predetermined means determine, decide, or establish in advance. In certain exemplary embodiments, first information device 2200 can be notified regarding the asynchronous and/or offline response by first server 2400 and/or second server 2500. As used herein, the phrase notification means information transmitted to advise an entity of an event, status, or condition. As used herein, the phrase status means a state and/or condition and/or information related thereto.

First server 2400 can comprise a processor 2480 adapted to, responsive to a determination that a Web-based transaction has caused an exceedance of a maximum threshold percentage of transactions processed offline, render an automatic alert indicative of the exceedance. As used herein, the phrase responsive means reacting to an influence and/or impetus. As used herein, the phrase offline means substantially not in hard-real time. As used herein, the phrase maximum means a greatest extent. As used herein, the phrase indicative means serving to indicate. As used herein, the phrase exceed means to be greater than. As used herein, the phrase exceedance means an incident wherein a value is greater than a predetermined threshold. As used herein, the phrase determine means to obtain, calculate, decide, deduce, establish, and/or ascertain. As used herein, the phrase automatic means performed via an information device in a manner essentially independent of influence and/or control by a user. As used herein, the phrase automatically means acting and/or operating in a manner essentially independent of external human influence and/or control. As used herein, the phrase cause means to bring about, provoke, precipitate, produce, elicit, be the reason for, result in, and/or effect. For example, an automatic light switch can turn on upon "seeing" a person in its view, without the person manually operating the light switch. As used herein, the phrase alert means an electrical, electronic, or mechanical device and/or display that serves to advise of a condition by way of a sound or signal. The Web-based transaction can be requested from a browser. An estimated time to complete the Web-based transaction can be automatically rendered at the browser. The estimated time automatically determined based upon historical transaction records. As used herein, the phrase based upon means determined in consideration of and/or derived from. As used herein, the phrase historical means past. The processor can be adapted to cause the browser to render a user-selectable option to cancel the Web-based transaction. As used herein, the phrase select means to make and/or indicate a choice and/or selection from among alternatives. As used herein, the phrase selectable means capable of being chosen and/or selected.

A notification regarding the transaction can utilize a callback based upon an address associated the browser. The address can be based upon a correlation identifier. The data set can be transmitted to second server 2500, which can be associated with the address. The Enterprise Application can be running on first server 2400.

Second server 2500 can comprise a user program 2520 and a user interface 2560 as well as a memory device 2540. User program 2520 can be adapted to receive a request for asynchronously provided information and/or request for a transaction to be completed to first information device 2200. User program 2520 can be adapted to acquire, transform, format, merge, load, and/or store information related to the request for asynchronous transmission and/or the transaction to first information device 2200.

In certain exemplary embodiments, user program 2420 and/or user program 2520 can be implemented using Web Logic Java Application Server and/or Java 2 Platform Enterprise Edition (J2EE) technologies, such as Web Services, Enterprise Java Beans (EJB), Java Messaging Service (JMS), eXtensible Markup Language (XML), Business Processes, and/or Java, etc. In certain exemplary embodiments, user program 2420 and/or user program 2520 can be implemented as web services, which can conform to a service oriented architecture. Authentication and/or authorization of the client can be implemented using user program 2420, which can confirm the identity of the client to a J2EE security method. JMS can be used for queuing the request and/or responses in an input queue, a synchronous output queue, and/or an asynchronous output queue. As used herein, the phrase input means a signal, data, and/or information provided to a processor, device, and/or system. User program 2420 and/or user program 2520 can utilize one or more J2EE component technologies such as EJB, Java Database Connectivity (JDBC), and/or Hyper Text Transfer Protocol (HTTP), etc., to process the request and/or associated subrequests to collect and/or aggregate the data set since databases accessed to acquire the data set can be distributed in nature. As used herein, the phrase HyperText Transfer Protocol (HTTP) means the underlying protocol used by the World Wide Web. HTTP defines how Web messages are formatted and transmitted, and what actions Web servers and browsers should take in response to various commands. For example, when you enter a typical URL in your browser, this actually sends an HTTP command to the Web server directing it to fetch and transmit the requested Web page. The data set can be formatted via user program 2420 and/or user program 2520 utilizing XML.

In certain exemplary embodiments, user program 2420 and/or user program 2520 can be implemented using C/C++, Common Object Request Broker Architecture (CORBA), a Transmission Control Protocol/Internet Protocol (TCP/IP) based distributed client/server mechanism, and/or MQ Series (i.e., a network communication technology developed by IBM, of Armonk, N.Y., adapted to allow independent and/or potentially non-concurrent applications on a distributed system to communicate with each other), and/or other messaging middleware, etc. As used herein, the phrase Internet Protocol (IP) means a network protocol that specifies the format of packets, also called datagrams, and the addressing scheme for the packets. By itself, IP is a protocol for providing a message from a source to a network, but does not establish a direct link between the source and the destination. TCP/IP, on the other hand, can establish a connection between two communicators so that they can send messages back and forth for a period of time.

Events can be logged by user program 2420 and/or user program 2520. The events can comprise: entry of request information into the input queue, retrieval of the request from the input queue, transmission of the request information to a request processor, transmission of request processor sends information to an aggregator, transmission of information from the aggregator to an access layer component (multiple access instances can be invoked), a request to a back end systems and/or database by the access layer component, a receipt of data set information by the access layer component from the back end system and/or database (multiple log entries of data set information transmittal from back end systems and/or databases can be entered for a given request depending upon a nature of the request), receipt of a response data by the aggregator from the access layer component, receipt of an aggregated response by the request processor from the aggregator, an entry of the data set into a synchronous output queue or asynchronous output queue by the request processor, transmission of a response to the client, transmission of a synchronous response and/or timeout message (i.e. when a response to a request is provided via an asynchronous request), failure of a security check, detection of an error and/or transmission of an error message to the client, and/or transmission and/or receipt of a notification to the client (which can comprise a notification that a data set is available for the client to retrieve, etc.

In certain exemplary embodiments, first information device 2200 can request a data set related to a Customer Relationship Management (CRM) application. For example, a sales team might desire information related to one or more business cases associated with negotiating and/or establishing a contract with a customer. The sales team might desire a relatively large data set that comprises customer and/or inventory data. As another example, an ordering entity might desire to configure, reconfigure, change, and/or delete customer services. As used herein, the phrase configure means to design, arrange, set up, shape, and/or make suitable and/or fit for a specific purpose. Certain exemplary embodiments can assemble customer and/or inventory data by location and/or cross location for single or multiple customer contacts. Certain exemplary embodiments can be utilized in providing on-demand television services such that screen freezes can be avoided and/or reduced in count and/or duration. In such applications a user can browse channels while the data set is downloaded from a server associated with the on-demand television services.

Figure 3:
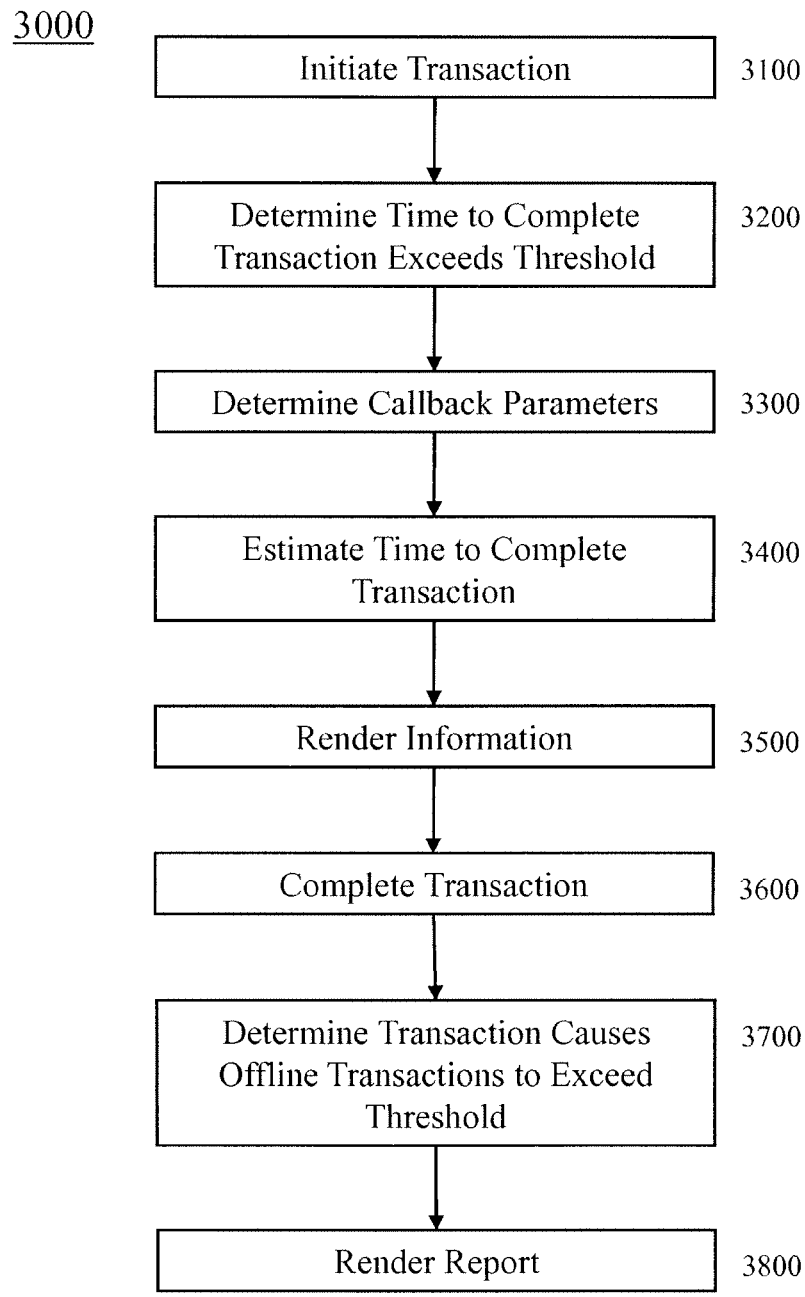
FIG. 3 is a flowchart of an exemplary embodiment of a method 3000.

FIG. 3 is a flowchart of an exemplary embodiment of a method 3000. As used herein, the phrase method means one or more acts that are performed upon subject matter to be transformed to a different state or thing and/or are tied to a particular apparatus, said one or more acts not a fundamental principal and not pre-empting all uses of a fundamental principal. Any set and/or subset of activities of method 3000 can be implemented automatically. Any set or subset of activities of method 3000 can be carried out via machine-implementable instructions stored on a machine-readable medium. As used herein, the phrase machine means a device and/or vehicle adapted to perform at least one task. As used herein, the phrase machine-implementable instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein, the phrase machine-readable means capable of being discerned by an information device. As used herein, the phrase machine-readable medium means a physical structure from which a machine, such as an information device, computer, microprocessor, and/or controller, etc., can obtain and/or store data, information, and/or instructions. Examples include memories, punch cards, and/or optically-readable forms, etc. As used herein, the phrase structure means that which is complexly constructed, such as a building and/or an addition to a building; a hierarchy and/or placement of objects in a document; and/or a manner in which components arc organized and/or form a whole. As used herein, the phrase instructions means directions, which can be implemented as firmware and/or software, the directions adapted to perform a particular operation or function. As used herein, the phrase activity means an action, act, deed, function, step, and/or process and/or a portion thereof. At activity 3100, a user can initiate and/or request a Web-based transaction via an interface such as a web browser. The request for the Web-based data transaction can be received at a server.

At activity 3200, a determination can be made that a time to complete the transaction exceeds a predetermined threshold. In certain exemplary embodiments, based upon an identified transaction type, a real-time transaction timeout threshold value of the Web-based transaction can be determined. In certain exemplary embodiments, based upon the Web-based transaction exceeding a real-time transaction timeout threshold value, the Web-based transaction can be placed in an offline processing queue. In certain exemplary embodiments, based upon an identified transaction type, an offline transaction timeout threshold value of the Web-based transaction can be determined. The Web-based transaction can be processed offline based upon the offline transaction timeout threshold value.

At activity 3300, call back parameters can be determined. As used herein, the phrase parameter means a value and/or object, which is used to transfer information to or from programs and/or subprograms. As used herein, the phrase call back means an attempted communication to a previously used address. The call back parameters can be established to the browser. The call back parameters can be utilized to provide information to the user regarding the transaction. The call back parameters can be used to transmit information to the browser regarding the transaction.

At activity 3400, a time can be estimated for completion of the transaction. The estimated time of the Web-based transaction can be automatically determined based upon historical transaction records. In certain exemplary embodiments, maximum threshold percentage of transactions processed offline can be established.

At activity 3500, information regarding the pending transaction can be rendered. Based upon the call back parameters, an automatic notification of a status of the Web-based transaction can be set up. Via the browser, an estimated time for completion of the Web-based transaction can be automatically rendered. Via the browser, a user-selectable option to cancel the Web-based transaction can be automatically rendered. The estimated time to complete the Web-based transaction automatically rendered at the browser. Responsive to a determination that the Web-based transaction exceeds the offline transaction timeout value, an alert can be rendered at the browser.

At activity 3600, the transaction can be processed and/or completed. In certain exemplary embodiments, the transaction can be processed via a real-time queue and/or an offline processing queue.

At activity 3700, a determination can be made that the transaction causes offline transaction to exceed a predetermined maximum threshold percentage for offline transaction. The predetermined maximum threshold percentage can be set based upon network objectives and/or characteristics.

At activity 3800, a report can be rendered regarding the transaction. In certain exemplary embodiments, responsive to a determination that a Web-based transaction has caused the exceedance of the maximum threshold percentage of transactions processed offline, at a user interface of an information device, an automatic alert indicative of the exceedance can be rendered. Responsive to completion of the Web-based transaction, a notification can be provided to the browser.

Figure 4:
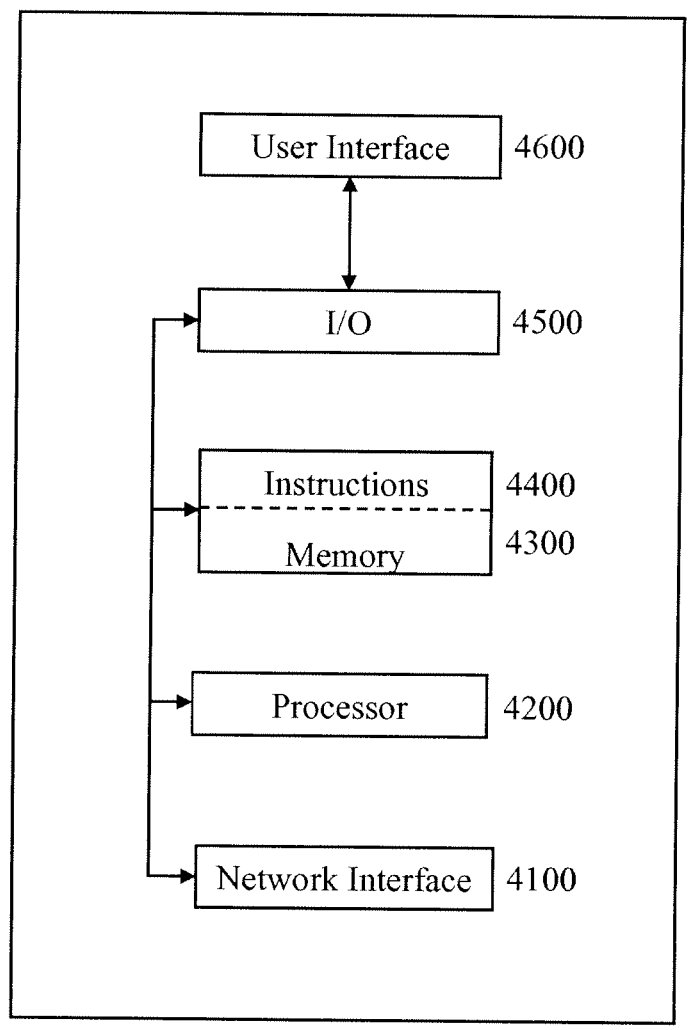
FIG. 4 is a block diagram of an exemplary embodiment of an information device 4000.

FIG. 4 is a block diagram of an exemplary embodiment of an information device 4000, which in certain operative embodiments can comprise, for example, first server 2400, second server 2500, first information device 2200, and second information device 2200 of FIG. 2. Information device 4000 can comprise any of numerous circuits and/or components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc. As used herein, the phrase cause means to bring about, provoke, precipitate, produce, elicit, be the reason for, result in, and/or effect. As used herein, the phrase circuit means a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network. As used herein, the phrase logic gate means a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service. As used herein, the phrase Boolean logic means a complete system for logical operations.

As used herein, the phrase information device means any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

As used herein, the phrase interface means (n) a boundary across which two independent systems meet and act on and/or communicate with each other; (v) to connect with and/or interact with by way of an interface. As used herein, the phrase memory device means an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

As used herein, the phrase network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device. As used herein, the phrase logical means a conceptual representation.

In certain exemplary embodiments, via one or more user interfaces 4600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein. As used herein, the phrase create means to make, form, produce, generate, bring into being, and/or cause to exist.

As used herein, the phrase haptic means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity. As used herein, the phrase further means in addition. As used herein, the phrase may means is allowed and/or permitted to, in at least some embodiments. As used herein, the phrase output means (n) something produced and/or generated; data produced by an information device executing machine-readable instructions; and/or the energy, power, work, signal, and/or information produced by a system; (v) to provide, produce, manufacture, and/or generate. As used herein, the phrase packet means a generic term for a bundle of data organized in a specific way for transmission, such as within and/or across a network, such as a digital packet-switching network, and comprising the data to be transmitted and certain control information, such as a destination address.

As used herein, the phrase process means (n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result. As used herein, the phrase said means when used in a system or device claim, an article indicating a subsequent claim term that has been previously introduced.

DEFINITIONS

When definitions are provided for terms used substantively herein, those definitions apply throughout this document and until amended. Such terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, any activity can be performed by multiple entities, and/or any activity can be performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method for processing transactions, comprising:
   receiving a request for a Web-based transaction from a browser;
   automatically estimating a time to complete said Web-based transaction based upon historical transaction records;
   determining whether the Web-based transaction has caused an exceedance of a maximum threshold percentage of transactions processed offline; and
   responsive to a determination that the Web-based transaction has caused an exceedance of the maximum threshold percentage of transactions processed offline, at a user interface of an information device, rendering an automatic alert indicative of said exceedance and the estimated time to complete said Web-based transaction.

2. The method of claim 1, further comprising:
based upon an identified transaction type, determining a real-time transaction timeout threshold value of said Web-based transaction.

3. The method of claim 1, further comprising:
based upon an identified transaction type, determining an offline transaction timeout threshold value of said Web-based transaction, said Web-based transaction processed offline based upon said offline transaction timeout threshold value.

4. The method of claim 1, further comprising:
based upon said Web-based transaction exceeding a real-time transaction timeout threshold value, placing said Web-based transaction in an offline processing queue.

5. The method of claim 1, further comprising:
processing said Web-based transaction.

6. The method of claim 1, further comprising:
automatically establishing call back parameters to said browser.

7. The method of claim 1, further comprising:
based upon call back parameters, setting up an automatic notification of a status of said Web-based transaction.

8. The method of claim 1, further comprising:
via said browser, automatically rendering a user-selectable option to cancel said Web-based transaction.

9. The method of claim 1, further comprising:
responsive to completion of said Web-based transaction, providing a notification to said browser.

10. The method of claim 1, further comprising:
responsive to a determination that said Web-based transaction exceeds an offline transaction timeout value, rendering an alert at said browser.

11. The method of claim 1, further comprising:
establishing said maximum threshold percentage of transactions processed offline.

12. A system comprising:
a processor;
a data bus coupled to the processor;
a memory coupled to the data bus; and
a computer-usable medium embodying computer program code, the computer program code comprising instructions executable by the processor and configured for:
   receiving a request for a Web-based transaction from a browser;
   automatically estimating a time to complete said Web-based transaction based upon historical transaction records;
   determining whether the Web-based transaction has caused an exceedance of a maximum threshold percentage of transactions processed offline; and
   responsive to a determination that the Web-based transaction has caused an exceedance of the maximum threshold percentage of transactions processed offline, at a user interface of an information device, rendering an automatic alert indicative of said exceedance and the estimated time to complete said Web-based transaction.

13. A non-transitory machine-readable storage medium comprising machine-implementable instructions for activities comprising:

receiving a request for a Web-based transaction from a browser;
automatically estimating a time to complete said Web-based transaction based upon historical transaction records;
determining whether the Web-based transaction has caused an exceedance of a maximum threshold percentage of transactions processed offline; and
responsive to a determination that the Web-based transaction has caused an exceedance of the maximum threshold percentage of transactions processed offline, at a user interface of an information device, rendering an automatic alert indicative of said exceedance and the estimated time to complete said Web-based transaction.

* * * * *